(12) United States Patent
Son et al.

(10) Patent No.: US 12,404,048 B2
(45) Date of Patent: Sep. 2, 2025

(54) MISSION EQUIPMENT MOUNT APPARATUS WITH IMPROVED CONTROL PERFORMANCE

(71) Applicant: NEARTHLAB INC., Seoul (KR)

(72) Inventors: Byoung Kyu Son, Gunpo-si (KR); Yoon Young Kim, Seoul (KR); Yeong Ryeol Choi, Hwaseong-si (KR)

(73) Assignee: NEARTHLAB INC., Seoul (KR)

( * ) Notice: Subject to any disclaimer, the term of this patent is extended or adjusted under 35 U.S.C. 154(b) by 0 days.

(21) Appl. No.: 18/852,734

(22) PCT Filed: Oct. 18, 2023

(86) PCT No.: PCT/KR2023/016206
§ 371 (c)(1),
(2) Date: Feb. 19, 2025

(87) PCT Pub. No.: WO2024/257956
PCT Pub. Date: Dec. 19, 2024

(65) Prior Publication Data
US 2025/0178756 A1    Jun. 5, 2025

(30) Foreign Application Priority Data
Jun. 15, 2023 (KR) .................. 10-2023-0076814

(51) Int. Cl.
*B64U 20/87* (2023.01)
*B64U 101/30* (2023.01)
*G03B 15/00* (2021.01)

(52) U.S. Cl.
CPC ........... *B64U 20/87* (2023.01); *G03B 15/006* (2013.01); *B64U 2101/30* (2023.01)

(58) Field of Classification Search
None
See application file for complete search history.

(56) References Cited

U.S. PATENT DOCUMENTS 10,556,708 B2 *  2/2020  Zhao ............... B64U 20/87
10,670,183 B2 *  6/2020  Bin ................. F16M 11/38
(Continued)

FOREIGN PATENT DOCUMENTS

CN        111634431 A       9/2020
KR        20140004877 U     9/2014
(Continued)

OTHER PUBLICATIONS

International Search Report for International Patent Application No. PCT/KR2023/016206.
(Continued)

*Primary Examiner* — Stephanie E Bloss
*Assistant Examiner* — Diana Hancock
(74) *Attorney, Agent, or Firm* — Perilla Knox & Hildebrandt LLP; Thomas B. Hildebrandt (57) ABSTRACT

A mission equipment mount apparatus includes: a damping part including a first damping part connected to a first side of a body of a drone, a second damping part connected to a second side that is connected to the first side of the body of the drone, and a third damping part connected to a third side that is connected to the second side of the body of the drone, a mount part which is connected to the second damping part and on which a mission equipment is seated, and a connecting part configured to connect the second damping part and the mount part to each other. The damping part has a shape of a ⊏-shaped frame through disposition of the first damping part, the second damping part, and the third damping part.

10 Claims, 7 Drawing Sheets

(56) References Cited

U.S. PATENT DOCUMENTS

| | | | |
|---|---|---|---|
| 11,106,118 B2* | 8/2021 | Zhou | G03B 17/561 |
| 2014/0037278 A1* | 2/2014 | Wang | G03B 15/006 |
| | | | 396/55 |
| 2018/0007248 A1* | 1/2018 | Zeise | H04N 23/685 |
| 2020/0262581 A1 | 8/2020 | Zhao et al. | |
| 2021/0163130 A1 | 6/2021 | Liu et al. | |
| 2021/0341628 A1* | 11/2021 | Suzuki | G01S 19/14 |

FOREIGN PATENT DOCUMENTS

| | | |
|---|---|---|
| KR | 101619836 B1 | 5/2016 |
| KR | 1020170136309 A | 12/2017 |
| KR | 102125445 B1 | 5/2020 |
| KR | 102459947 B1 | 10/2022 |

OTHER PUBLICATIONS

Written Opinion for International Patent Application No. PCT/KR2023/016206.

Office Action for Korean Application No. 1020230076814 mailed May 29, 2025.

\* cited by examiner

MISSION EQUIPMENT MOUNT APPARATUS WITH IMPROVED CONTROL PERFORMANCE

CROSS-REFERENCE TO RELATED APPLICATION

The present disclosure is a national phase application under 35 U.S.C. § 371 of International Application No. PCT/KR2023/016206 filed Oct. 18, 2023, which claims the benefit of and priority to Korean Patent Application No. 10-2023-0076814 filed Jun. 15, 2023, the contents of which being incorporated by reference in their entireties herein.

TECHNICAL FIELD

The disclosure relates to a mission equipment mount apparatus which enables mission equipment to be installed on a commercial drone.

Specifically, the disclosure relates to a mission equipment mount apparatus which can improve the control performance and maintainability of an aerial vehicle.

BACKGROUND ART

In general, on a large structure, such as a building or a wind power generator, damage such as cracks may occur naturally or artificially over the course of its lifespan. If the damage to the large structure is not discovered, maintained, or managed at the right time, the damage may become more severe, and thus the deformation or collapse of the entire structure may occur. Accordingly, in managing the structure, it is very important to periodically diagnose and manage safety of the structure before the occurrence of the deformation or collapse of the entire structure.

However, for large structures, it is very difficult to perform safety diagnosis manually due to limitations of accessibility and limitations of time and economic costs. Recently, in order to perform the safety diagnosis for the large structure, the development of a vision recognition system using a drone has been made.

However, because a drone mounted with a vision recognition system for detecting the damage of the structure is very expensive and the mission equipment (e.g., imaging module or LiDAR sensor) has not been standardized, the mission equipment of different standards and specifications has been used for each manufacturer in a state where the drone and the mission equipment are integrated in one piece, and thus it is very difficult to use different mission equipment depending on the situation.

Further, according to a drone in the related art, the mission equipment is mounted on a lower center part of the drone so that the center of gravity does not shake. In case that the mission equipment is mounted on the lower center part of the drone, imaging of a part of the structure that is lower than the flight altitude of the drone can be easily performed, but due to interference with the body of the drone, imaging of a part of the structure that is higher than the flight altitude of the drone may be difficult to be performed.

In addition, according to the drone in the related art, there are many problems in that variables are caused during the mission due to the occurrence of volatility due to external forces, maintenance of the drone is somewhat degraded, the damping force is somewhat low to be vulnerable to the vibration of the mission equipment, or inconvenience is caused in detaching or mounting a part of an aircraft module.

SUMMARY OF INVENTION

Technical Problem

It is an object of the present disclosure to provide a mission equipment mount apparatus for mounting desired mission equipment on a commercial drone.

Further, it is another object of the present disclosure to provide a mission equipment mount apparatus for mounting mission equipment on the front of a drone so that the mission equipment can freely perform imaging of a part of a structure that is higher or lower than the flight altitude of the drone.

Further, it is another object of the present disclosure to provide a mission equipment mount apparatus which maintains a relatively good center of gravity of a drone while mounting mission equipment on the front of the drone.

Further, it is another object of the present disclosure to provide a mission equipment mount apparatus which minimizes transfer of vibration from a body of a drone to mission equipment.

In addition, it is an object of the present disclosure to provide a mission equipment mount apparatus which can improve the control performance and maintainability of an aerial vehicle through frame shapes of a damping part, a mount part, and a connecting part.

The objects of the present disclosure are not limited to the objects mentioned above, and other objects and advantages of the present disclosure that have not been mentioned can be understood by the following description and will be more clearly understood by the embodiments of the present disclosure. Further, it will be readily appreciated that the objects and advantages of the present disclosure may be realized by the means set forth in the claims and combinations thereof.

Solution to Problem

According to some aspects of the disclosure, a mission equipment mount apparatus comprises: a damping part including a first damping part connected to a first side of a body of a drone, a second damping part connected to a second side that is connected to the first side of the body of the drone, and a third damping part connected to a third side that is connected to the second side of the body of the drone; a mount part which is connected to the second damping part and on which a mission equipment is seated, and a connecting part configured to connect the second damping part and the mount part to each other, wherein the damping part has a shape of a ⊏-shaped frame through disposition of the first damping part, the second damping part, and the third damping part.

According to some aspects, the first side is an upper side of the drone, the second side is a front side of the drone that is a nearest side to the mount part among a plurality of sides of the drone, and the third side is a bottom side of the drone.

According to some aspects, the connecting part is connected between one side of the mount part and the second damping part.

According to some aspects, the connecting part is a single arm type frame that is formed between a connecting frame included in the mount part and the second damping part.

According to some aspects, the mission equipment comprises at least one of an imaging module and a sensing system, wherein the mount part includes a mount frame on which the imaging module and the sensing system are seated, and wherein the imaging module is seated inside the mount frame, and the sensing system is seated on an upper side of the mount frame.

According to some aspects, the first damping part comprises: an adaptor frame attached to the first side; and a bridge frame connected to the adaptor frame and the second damping part.

According to some aspects, the first damping part comprises at least one damper disposed between the adaptor frame and the bridge frame.

According to some aspects, the damper comprises a single damper composed of a wire damper and a complex damper where a sponge damper is seated on an inside of a wire damper.

According to some aspects, the single damper and the complex damper have different angles connecting the adaptor frame and the bridge frame to each other.

According to some aspects, the complex damper is disposed at a location that is further spaced apart from the mount part compared to the single damper.

Aspects of the disclosure are not limited to those mentioned above and other objects and advantages of the disclosure that have not been mentioned can be understood by the following description and will be more clearly understood according to embodiments of the disclosure. In addition, it will be readily understood that the objects and advantages of the disclosure can be realized by the means and combinations thereof set forth in the claims.

Advantageous Effects

The mission equipment mount apparatus according to some embodiments of the present disclosure can enable a user to expand user's choice of the drone and the mission equipment by enabling the desired mission equipment to be mounted on the commercial drone.

Further, the mission equipment mount apparatus according to some embodiments of the present disclosure can freely perform imaging of the part of the structure that is higher or lower than the flight altitude of the drone, and thus can reduce time and economic costs by making flight paths simpler.

Further, the mission equipment mount apparatus according to some embodiments of the present disclosure can maintain a relatively good center of gravity of the drone, and thus has the advantage of being able to fly the drone with stability.

Further, the mission equipment mount apparatus according to some embodiments of the present disclosure can minimize the transfer of the vibration from the body of the drone to the mission equipment, and thus can enable the mission equipment to perform the mission more stably and effectively.

Further, the mission equipment mount apparatus according to some embodiments of the present disclosure can improve the control performance and maintainability of the aerial vehicle through the frame shapes of the damping part, the mount part, and the connecting part.

Further, the mission equipment mount apparatus according to the present disclosure uses individual dampers, and thus enables diversification of the dampers according to purposes. That is, unlike the method in the related art, in which several dampers are all arranged in a plate shape, the mission equipment mount apparatus according to the present disclosure can freely define the angles and directions of the dampers through the use of the individual dampers.

Further, the mission equipment mount apparatus according to the present disclosure can increase modularity convenience and assembly by using an adaptor frame between aircraft modules. In other words, according to the mission equipment mount apparatus according to the present disclosure, it may be convenience to detach or mount parts of the aircraft modules by using the adaptor frame or the like.

DETAILED DESCRIPTION

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own inventive concept in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are only used to differentiate one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular forms are intended to include plural forms unless the context clearly indicates otherwise. In the application, terms such as "comprise," "comprise," "have," etc. should be understood as not precluding the possibility of existence or addition of features, numbers, steps, operations, components, parts, or combinations thereof described herein.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless defined otherwise, all terms used herein, including technical or scientific terms, have the same meaning as commonly understood by those skilled in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the application. In addition, each configuration, procedure, process, method, or the like included in each embodiment of the disclosure may be shared to the extent that they are not technically contradictory to each other.

Hereinafter, with reference to FIGS. 1 to 5C, a mission equipment mount apparatus with improved control performance according to various embodiments of the present disclosure will be described.

Figure 1:
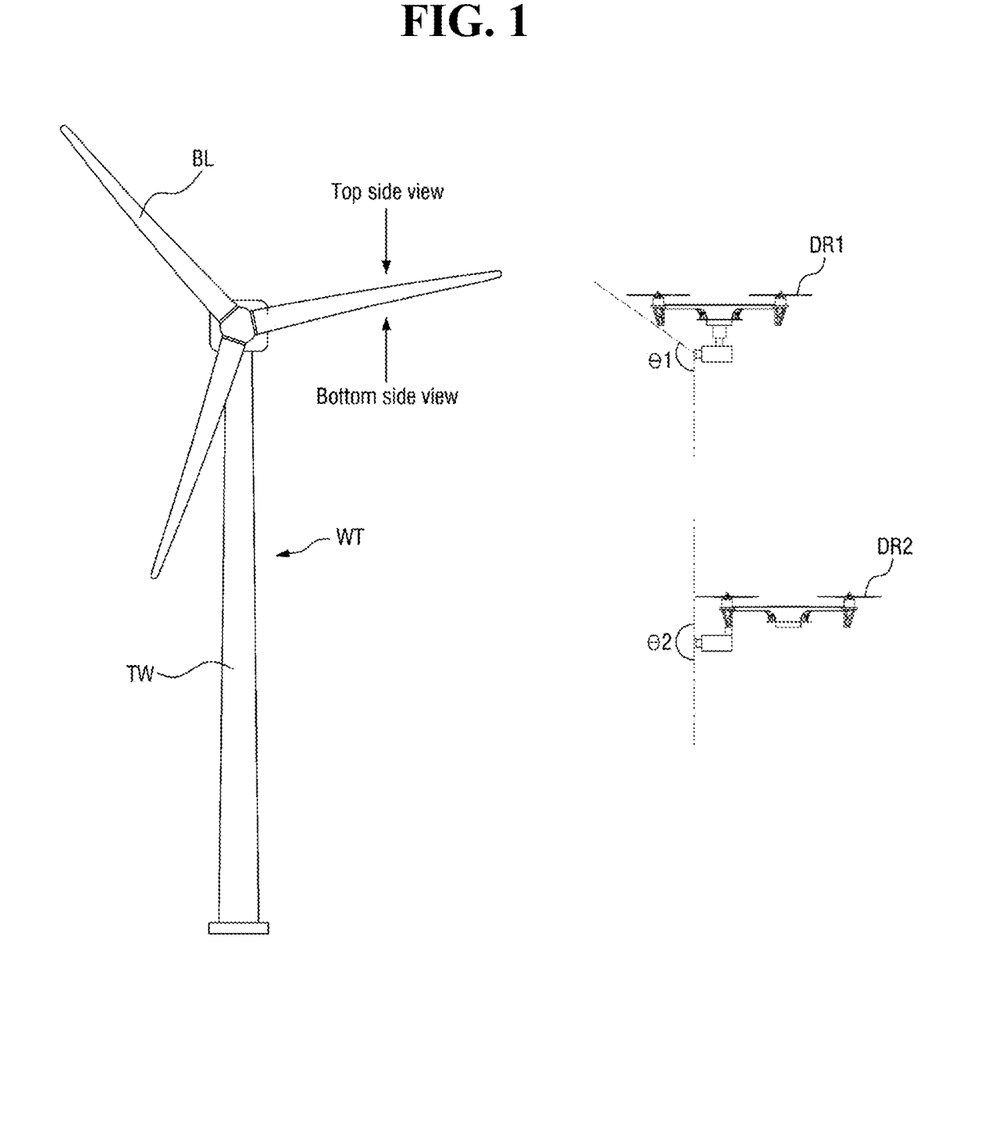
FIG. 1 is a view explaining a drone that performs safety diagnosis of a wind power generator structure and mission equipment mounted thereon.

FIG. 1 is a view explaining a drone that performs safety diagnosis of a wind power generator structure and mission equipment mounted thereon.

Referring to FIG. 1, a wind power generator structure WT may include a tower TW and a blade BL. Drones DR1 and DR2 that perform safety diagnosis of the wind power generator structure WT may vertically fly up based on the tower TW, explore the blade BL, and check for damage such as cracks on the blade BL. The drones DR1 and DR2 may determine whether the blade BL is damaged by scanning all of front, back, upper, and lower sides of the blade BL.

With respect to the first drone DR1, mission equipment may be mounted on a lower center area of the first drone DR1. The first drone DR1 may perform imaging of a desired area by properly changing an angle of the mission equipment. However, because the mission equipment of the first drone DR1 is mounted on the lower center area of the first drone DR1, it can perform imaging of only an area of a first angle θ1 due to interference with the body of the drone. In other words, the mission equipment of the first drone DR1 may perform imaging relatively freely by adjusting the angle of the mission equipment with respect to an area that is lower than the flight altitude of the first drone DR1. However, the mission equipment of the first drone DR1 is able to perform imaging only within a limited range even if the angle of the mission equipment is adjusted with respect to an area that is higher than the flight altitude of the first drone DR1.

With respect to the second drone DR2, the mission equipment may be mounted on a front side of the second drone DR2. The second drone DR2 may perform imaging of a desired area by properly changing the angle of the mission equipment. In this case, because the interference with the body of the drone is minimized, the mission equipment of the second drone DR2 can perform imaging of an area of a second angle θ2 that is larger than the first angle θ1. In other words, the mission equipment of the second drone DR2 is able to perform imaging relatively freely by adjusting the angle of the mission equipment with respect to an area that is higher or lower than the flight altitude of the second drone DR2.

As described above, the safety diagnosis of the wind power generator structure WT is performed by checking for damage, such as cracks on the blade BL, through imaging of all of front, back, upper, and lower sides of the blade BL.

Explanation will be made under the assumption that the safety diagnosis of the wind power generator structure WT is performed by using the first drone DR1.

First, for the safety diagnosis of the wind power generator structure WT, movement of the blade BL is suspended. Then, the first drone DR1 may perform imaging of the front, back, and upper sides of the blade BL while changing the flight altitude thereof. However, due to the angle limitations of the mission equipment, it may be difficult for the first drone DR1 to perform imaging of at least a part of the lower side of the blade BL. Accordingly, in case of using the first drone DR1, it is required to perform imaging of the lower side of the blade BL again after adjusting the blade BL so that the lower side of the blade BL is directed upward through partial rotation of the blade BL. Through the images of the front, back, upper, and lower sides of the blade BL being captured by the first drone DR1, it is checked whether damage has occurred on the blade BL.

Next, explanation will be made under the assumption that the safety diagnosis of the wind power generator structure WT is performed by using the second drone DR2.

In the same manner, for the safety diagnosis of the wind power generator structure WT, movement of the blade BL is suspended. Then, images of the front, back, upper, and lower sides of the blade BL are captured by using the second drone DR2. In this case, because the range of images that can be captured by the second drone DR2 is relatively free, all of the images of the front, back, upper, and lower sides of the blade BL can be captured even without rotating the blade BL. Through the images of the front, back, upper, and lower sides of the blade BL being captured by the second drone DR2, it is checked whether damage has occurred on the blade BL.

As described above, in case of using the first drone DR1 in which the mission equipment is mounted on the lower center area of the drone, it is required to additionally operate the wind power generator structure WT, and thus time and economic costs may occur additionally. Accordingly, in case that the imaging in all directions of the structure, such as the wind power generator structure WT, is required, it may be more effective in economy and time to use the drone in which the mission equipment is mounted on the front of the drone.

The drone that is integrally mounted with the mission equipment has the disadvantage of being relatively expensive. Further, a user needs to use appropriate mission equipment depending on the situation, and in case of the drone integrated with the mission equipment, there is also the disadvantage in that the replacement of the mission equipment is not easy. The mission equipment mount apparatus according to some embodiments has the advantage in that it is possible to mount the mission equipment desired by the user on the commercial drone desired by the user. That is, the mission equipment mount apparatus according to some embodiments has the advantage of enabling the user to expand the user's choice of the drone and the mission equipment.

Hereinafter, the mission equipment mount apparatus that can mount the mission equipment on the front of the drone will be described. By using the mission equipment mount apparatus according to some embodiments, it is possible to select and mount desired mission equipment on the commercial drone. That is, the mission equipment mount apparatus according to some embodiments may perform a function of connecting the mission equipment and the drone to each other. Hereinafter, this feature will be described in more detail with reference to FIGS. 2 to 5C.

Figure 2:
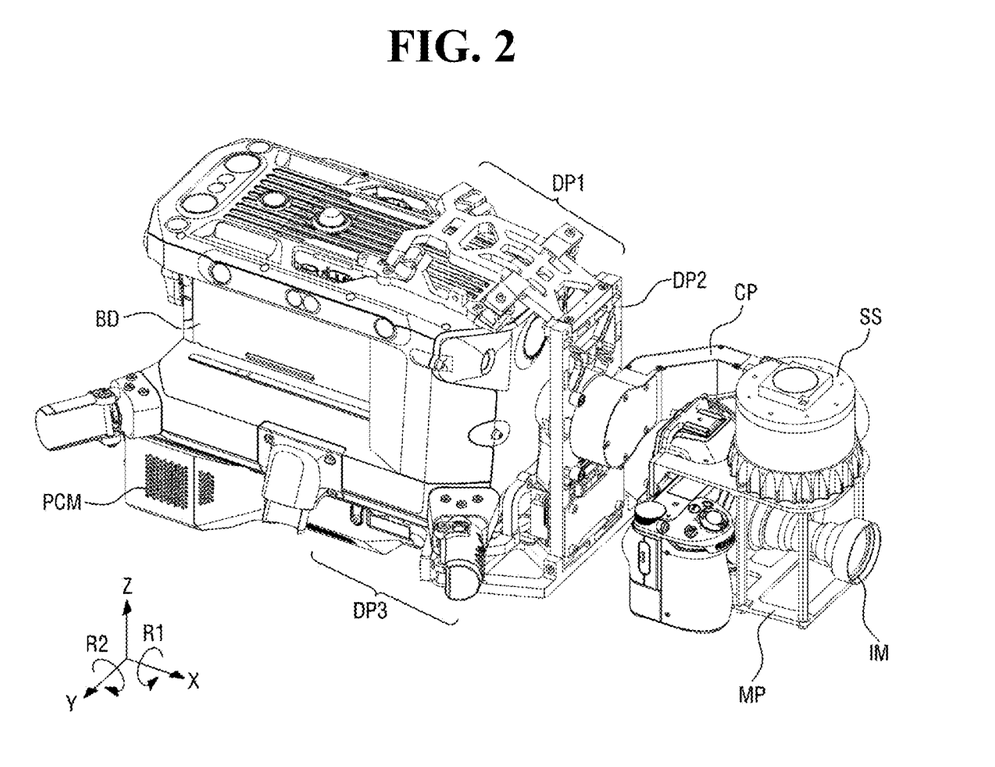
FIG. 2 is a perspective view explaining a mission equipment mount apparatus according to some embodiments of the present disclosure.
Figure 3:
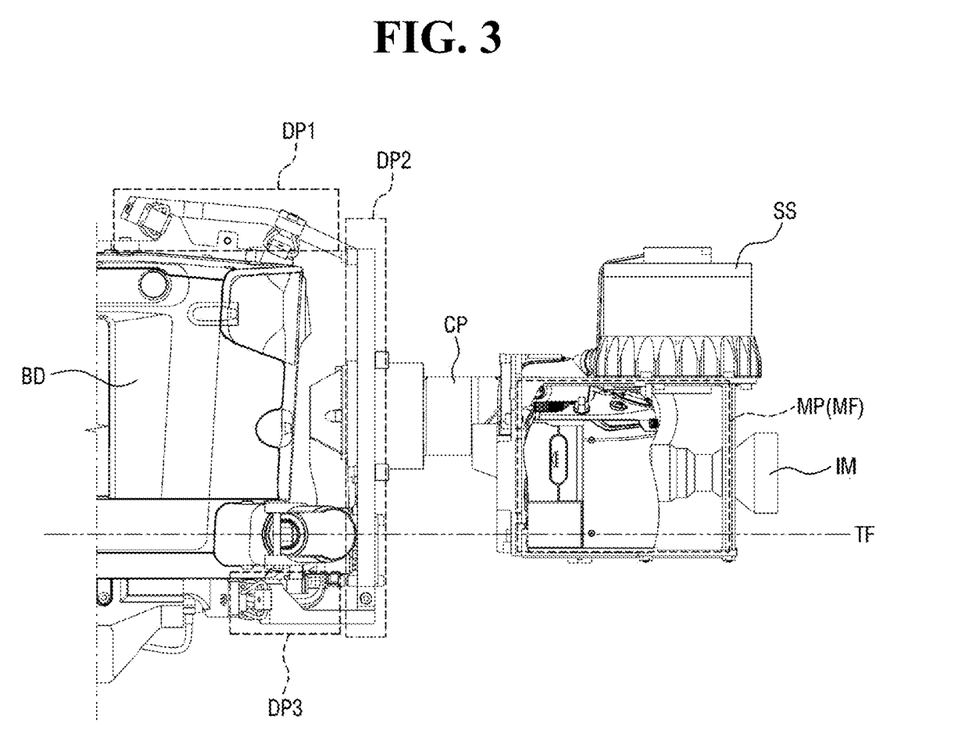
FIG. 3 is a side view explaining a mission equipment mount apparatus according to some embodiments of the present disclosure.
Figure 4:
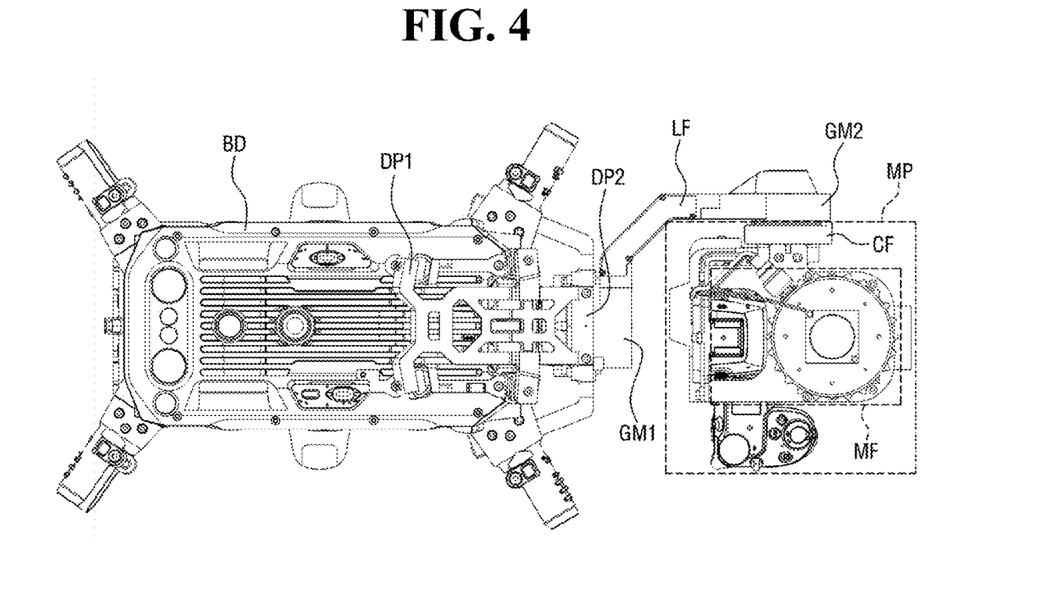
FIG. 4 is a plan view explaining a mission equipment mount apparatus according to some embodiments of the present disclosure.

FIG. 2 is a perspective view explaining a mission equipment mount apparatus according to some embodiments of the present disclosure. FIG. 3 is a side view explaining a mission equipment mount apparatus according to some embodiments of the present disclosure. FIG. 4 is a plan view explaining a mission equipment mount apparatus according to some embodiments of the present disclosure.

Referring to FIGS. 2 to 4, a body of a drone (hereinafter, referred to as "BD") and mission equipment (e.g., camera or sensor) which are coupled to a mission equipment mount apparatus are illustrated.

Referring to FIGS. 2 to 4, the mission equipment mount apparatus according to some embodiments of the present disclosure may include a damping part (hereinafter, referred to as "DP"), a mount part (hereinafter, referred to as "MP"), and a connecting part (hereinafter, referred to as "CP"). The damping part DP may include a first damping part DP1, a second damping part DP2, and a third damping part DP3, the mount part MP may include a connecting frame (hereinafter, referred to as "CF") and a mount frame (hereinafter, referred to as "MF"), and the connecting part CP may include a gimbal motor (hereinafter, referred to as "GM") and a linking frame LF. The gimbal motor GM may include a first gimbal motor GM1 and a second gimbal motor GM2.

The damping part DP plays the role of reducing and absorbing vibration and shock that are transferred to the drone and/or the mission equipment during flying.

In some embodiments, the damping part DP may include the first damping part DP1, the second damping part DP2, and the third damping part DP3. Each frame of the first to third damping parts DP1 to DP3 may be formed of a material in which carbon fibers and composite plastics are combined with each other or a nonferrous metal material, but the embodiment of the present disclosure is not limited thereto.

The first to third damping parts DP1 to DP3 may be combined with different sides of the body of the drone BD. In other words, the first to third damping parts DP1 to DP3 may be disposed at different angles based on the body of the drone BD when the mission equipment mount apparatus and the drone are combined with each other.

For example, the first damping part DP1 may be connected to a first side of the body of the drone BD, the second damping part DP2 may be connected to a second side of the body of the drone BD, and the third damping part DP3 may be connected to a third side of the body of the drone BD.

In this case, the first side of the body of the drone BD may be an upper side of the body of the drone BD, the second side of the body of the drone BD may be a front side of the body of the drone BD, and the third side of the body of the drone BD may be a lower side of the body of the drone BD. In other words, the first side of the body of the drone BD may be a side (side located further from the ground) that is located on an upper part among sides that are vertical to the direction in which the drone flies, the second side of the body of the drone BD may be a side that corresponds to the direction in which the drone flies, for example, a side that is located closest (most adjacent) to the mount part MP among a plurality of sides of the body of the drone BD, and the third side of the body of the drone BD may be a side located on a lower part (side located closer to the ground) among the sides that are vertical to the direction in which the drone flies. However, the embodiment of the present disclosure is not limited thereto.

In this case, the damping part DP may have the shape of a ⊏-shaped frame. For example, the damping part DP may have the shape of the ⊏-shaped frame through disposition of the first to third damping parts DP1 to DP3.

Referring to FIG. 3, for example, based on the side view, the first to third damping parts DP1 to DP3 included in the damping part DP form the ⊏-shaped frame that surrounds the front (side corresponding to the mount part MP) of the body of the drone BD. In other words, the first to third damping parts DP1 to DP3 included in the damping part DP constitute parts of the ⊏-shaped frame that surrounds the front of the body of the drone BD.

Through the damping part DP of the ⊏-shaped frame as described above, the mission equipment mount apparatus of the present disclosure may have an improved damping force.

That is, because the damping part DP has the ⊏-shaped frame, the distance between the first damping part DP1 and the third damping part DP3, which constitute both sides of the damping part DP, somewhat increases, and as the distance between the individual damping parts increases, the load that is applied to the damper included in the individual damping part decreases. Accordingly, the shape deformation of the damper included in the individual damping part is reduced, and through this, the damping force of the damper is improved, so that the damper can absorb the vibration of the mission equipment more efficiently.

Meanwhile, the first to third damping parts DP1 to DP3 may include frames and/or dampers for performing the damping operation.

For example, the first damping part DP1 may include an adaptor frame, a bridge frame, and a damper. These features will be described in detail later through FIGS. 5A to 5C. Further, the second damping part DP2 and the third damping part DP3 may include individual dampers connected to the body of the drone BD, respectively.

Meanwhile, the mission equipment mount apparatus may include a lower mount frame connected to the third damping part DP3, and a PC module (hereinafter, referred to as "PCM") of the drone may be mounted on the lower mount frame. FIG. 2 illustrates a state where the PC module PCM is mounted on the lower mount frame.

In general, the PC module PCM is often mounted on an upper side (side corresponding to the first damping part DP1) of the body of the drone BD. In contrast, according to the present disclosure, the PC module PCM of the drone is disposed on the lower side (side corresponding to the third damping part DP3) of the body of the drone BD through application of the mount frame, and thus the control performance of the drone can be improved.

That is, because the PC module PCM of the drone is disposed on the lower side of the body of the drone BD, the PC module PCM can be disposed close to a thrust face (TF of FIG. 3) of the drone, and thus the flight control performance of the drone can be improved.

On the mount part MP, the mission equipment for performing the mission of the drone is seated.

For some examples, the mount part MP may include the connecting frame CP and the mount frame MF. The connecting frame CF and the mount frame MF may be formed of a material in which carbon fibers and composite plastics are combined with each other or a nonferrous metal material, but the embodiment of the present disclosure is not limited thereto.

The connecting frame CF may play the role of connecting the mount part MP and the damping part DP to each other.

For some examples, the connecting frame CF may connect the mount part MP to the second damping part DP2. For example, the connecting frame CF may be connected to the connecting part CP, and through this, the mount part MP may be connected to the second damping part DP2.

Referring to FIG. 4, for example, the connecting frame CF included in the mount part MP may be connected to the second gimbal motor GM2 of the connecting part CP, and the second gimbal motor GM2 of the connecting part CP may be connected to the first gimbal motor GM1 through the linking frame LF, and the first gimbal motor GM1 may be connected to the second damping part DP2. Through this, the mount part MP may be connected to the second damping part DP2.

The mount frame MF may be a frame on an inside or one side of which the mission equipment is seated.

The mission equipment may include an imaging module (hereinafter, referred to as "IM") and a sensing system (hereinafter, referred to as "SS"). The imaging module IM may detect damage such as cracks of the structure, through vision recognition and the like. The imaging module IM may include a camera and an image sensor (CMOS sensor). The sensing system SS may detect the location of the structure and the distance from the structure so that the drone on which the mission equipment is seated does not collide with the structure. The sensing system SS may include a RiDAR sensor and an ultrasonic sensor. However, examples of the imaging module IM and the sensing system SS are not limited to the above-described examples.

For some examples, the mount frame MF may have the shape of □-shaped frame. Referring to FIG. 3, for example, the mount frame MF may be in the shape of □-shaped frame based on the side view. When based on the perspective view, the mount frame MF may be in the shape of a cube or a cuboid.

In this case, the imaging module IM may be seated inside the mount frame MF, and the sensing system SS may be seated on the upper side of the mount frame MF. In other words, the imaging module IM may be combined with the inside of the □-shaped frame, and the sensing system SS may be seated on the upper side of the □-shaped frame, that is, on the side that is located at the highest altitude on the □-shaped frame based on the ground.

As described above, because the mount part MP of the present disclosure includes the mount frame MF of the □-shaped frame, the mission equipment mount apparatus of the present disclosure may have a reduced volatility due to external forces.

That is, in case that the frame to which the mission equipment is fastened is in a flat type, the location of the mission equipment may be partially changed or unstable by the external forces (e.g., moving speed and moving angle of the drone), and thus there is a possibility of variable occurrence when performing the mission. In contrast, because the mission equipment mount apparatus of the present disclosure uses the mount frame MF of the D-shaped frame, the mission equipment can be firmly mounted, and thus the possibility of the variable occurrence can be lowered when performing the mission.

The connecting part CP plays the role of connecting the damping part DP connected to the body of the drone BD to the mount part MP.

For some examples, the connecting part CP may connect between one side of the mount part MP and the second damping part DP2. In other words, the connecting part CP may connect between any one of a plurality of areas of the mount part MP and the second damping part DP2.

For example, the connecting part CP may have the shape of a single arm type frame that connects between the connecting frame CF included in the mount part MP and the second damping part DP2. In this case, the connecting frame CF may be formed only on one side of the mount part MP. In other words, the mount part MP may not include plurality frames, but may include only one connecting frame CF.

As described above, because the connecting part CP of the present disclosure has the shape of the single arm type frame, the maintainability of the mission equipment mount apparatus of the present disclosure can be improved. In other words, because the connecting part CP of the present disclosure is formed in the shape of the single arm type frame, not a double arm type frame, the assemblability, convenience of maintenance, and accessibility of the apparatus can be improved.

That is, in case that the connecting part CP has the double arm type frame, and thus the connecting part CP is combined with two or more areas of the mount part MP, there are many inconveniences such as a lot of time is consumed when the corresponding mission equipment mount apparatus is assembled or maintained. According to the mission equipment mount apparatus of the present disclosure, the single arm type connecting part CP is constituted, and thus the assemblability, convenience of maintenance, and accessibility of the apparatus can be improved.

Meanwhile, the connecting part CP may include the gimbal motor GM and the linking frame LF. The gimbal motor GM may include the first gimbal motor GM1 and the second gimbal motor GM2. In this case, the linking frame LF may mean a frame formed between the first gimbal motor GM1 and the second gimbal motor GM2.

The first gimbal motor GM1 may be connected to the second damping part DP2 and the linking frame LF.

For some examples, the first gimbal motor GM1 may perform a function of maintaining horizontality in a first rotation direction R1 around a second direction X.

For example, if acceleration in the first rotation direction R1 is generated in the first gimbal motor GM1, the first gimbal motor GM1 may detect this, and may operate the motor in an opposite direction to the first rotation direction R1. In the same manner, if acceleration in an opposite direction to the first rotation direction R1 is generated in the first gimbal motor GM1, the first gimbal motor GM1 may detect this, and may operate the motor in the first rotation direction R1. Thus, the first gimbal motor GM1 can maintain the horizontality in the first rotation direction R1.

For example, if the body of the drone BD is tilted to the right when facing the ground due to internal factors or external environmental factors, the first gimbal motor GM1 detects the acceleration in the rightward direction. In this case, the first gimbal motor GM1 may make the mission equipment (imaging module IM and sensing system SS) maintain the horizontality by operating the motor in the leftward direction that is an opposite direction to the direction in which the acceleration is detected. Accordingly, even in case that the body of the drone shakes violently in left and right direction (e.g., first rotation direction R1) due to the internal factors or the external environmental factors, the mission equipment can stably perform the mission.

The linking frame LF may play the role of connecting between the first gimbal motor GM1 and the second gimbal motor GM2. In other words, the first gimbal motor GM1 may be connected to one side of the linking frame LF, and the second gimbal motor GM2 may be connected to the other side of the linking frame LF. The linking frame LF may be formed in one piece, or may be formed by assembling a plurality of parts. The linking frame LF may be formed of a material in which carbon fibers and composite plastics are combined with each other or a nonferrous metal material, but the embodiment of the present disclosure is not limited thereto.

The second gimbal motor GM2 may be connected to the linking frame LF and the connecting frame CF of the mount part MP.

The second gimbal motor GM2 may perform a function of maintaining horizontality in a second rotation direction R2. For example, if acceleration in the second rotation direction R2 is generated in the second gimbal motor GM2, the second gimbal motor GM2 may detect this, and may operate the motor in an opposite direction to the second rotation direction R2.

For example, if the body of the drone BD is tilted downward when facing the ground due to the internal factors or the external environmental factors, the second gimbal motor GM2 detects the acceleration in the downward direction. In this case, the second gimbal motor GM2 may make the mission equipment (imaging module IM and sensing system SS) maintain the horizontality by operating the motor in an upward direction that is an opposite direction to the direction in which the acceleration is detected. Accordingly, even in case that the body of the drone shakes violently in the left and right direction (e.g., second rotation direction R2) due to the internal factors or the external environmental factors, the mission equipment can stably perform the mission.

Hereinafter, with reference to FIGS. 5A to 5C, the first damping part DP1 according to some embodiments of the present disclosure will be described.

Figure 5A:
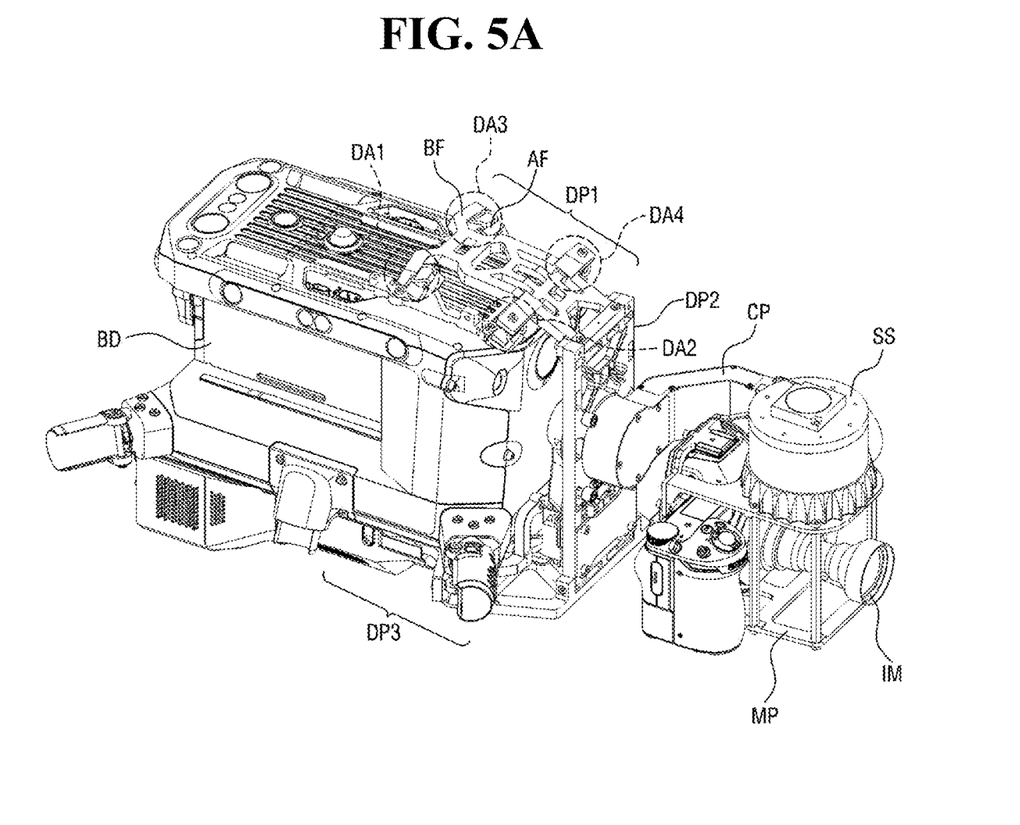
FIGS. 5A to 5C are views explaining a first damping part of a mission equipment mount apparatus according to some embodiments of the present disclosure.
Figure 5B:
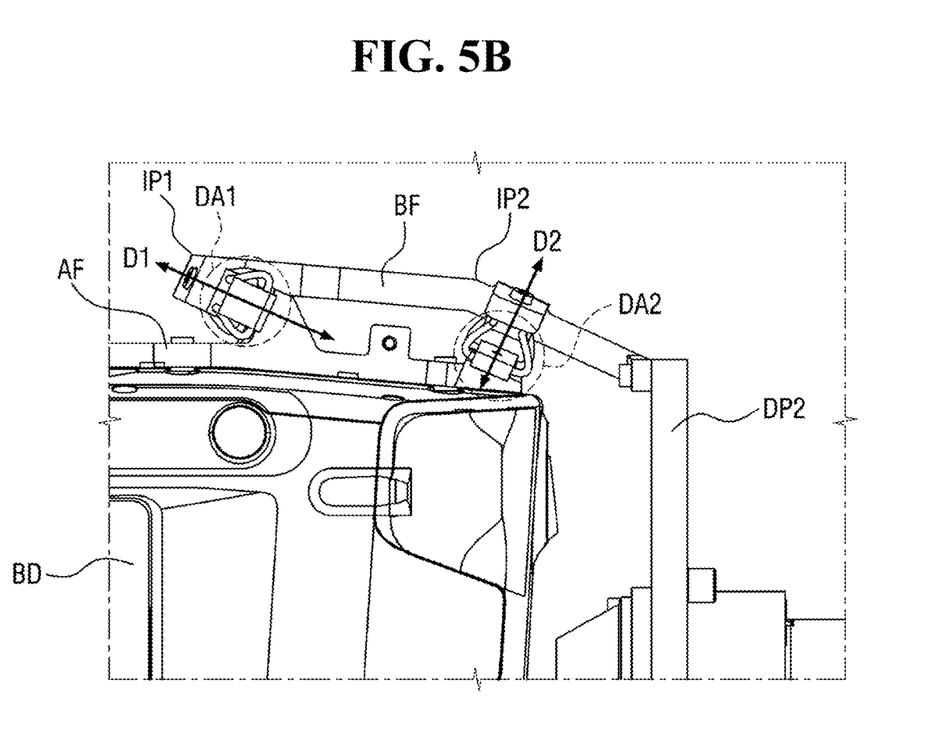
Figure 5C:
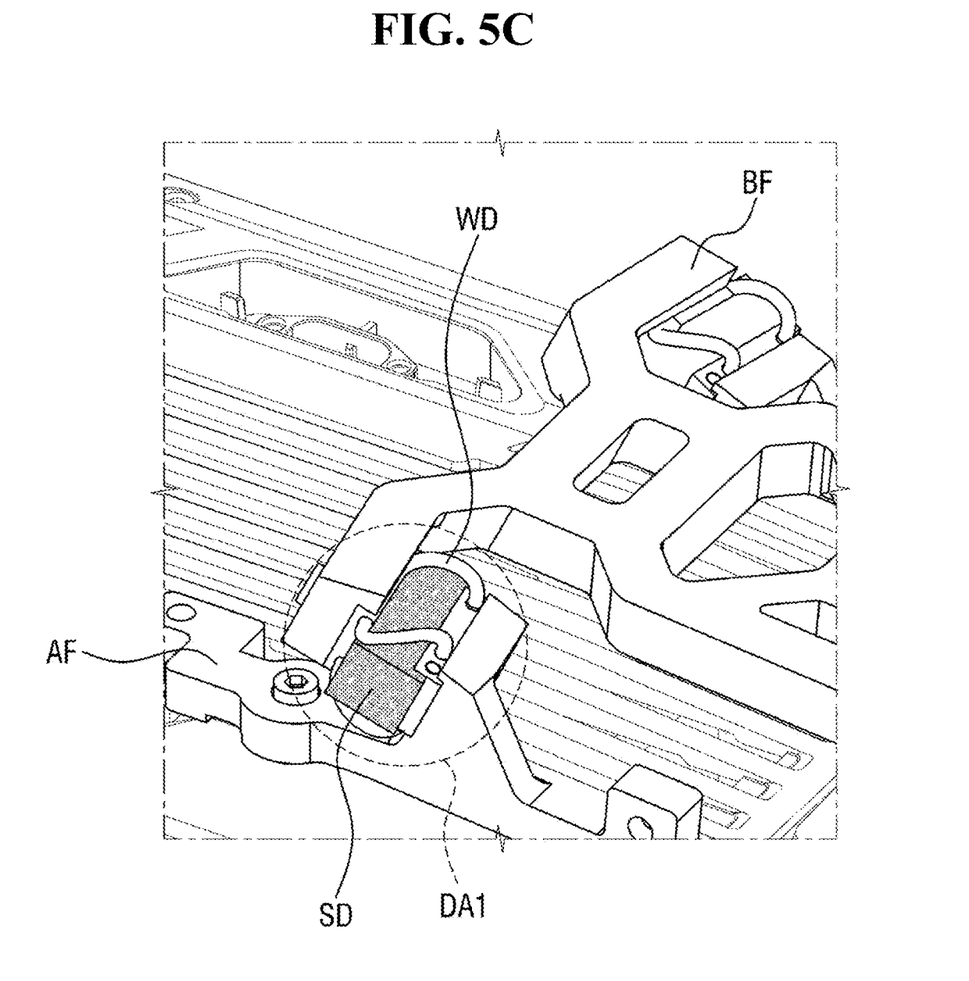

FIGS. 5A to 5C are views explaining a first damping part of a mission equipment mount apparatus according to some embodiments of the present disclosure. Specifically, FIG. 5A is a perspective view explaining the first damping part, FIG. 5B is a side view explaining the first damping part, and FIG. 5C is a view explaining a complex damper.

Referring to FIGS. 5A to 5C, the first damping part according to some embodiments of the present disclosure may include an adaptor frame (hereinafter, referred to as "AF"), a bridge frame (hereinafter, referred to as "BF"), and a damper (hereinafter, referred to as "DA").

The adaptor frame AF may be attached to one side of the body of the drone BD. For some examples, the adaptor frame AF may be attached to an upper side of the body of the drone BD, that is, a side (side located further from the ground) that is located on an upper part among sides that are vertical to the direction in which the drone flies. The adaptor frame AF may be attached to the one side of the body of the drone BD through structures such as bolts, nuts, and washers.

For some examples, the adaptor frame AF may include a plurality of areas that may be combined with dampers DA1 to DA4. For example, the adaptor frame AF may include through-holes through which bolts for fixing the adaptor frame AF to the dampers DA1 to DA4 can pass, but the embodiment of the present disclosure is not limited thereto.

In this case, angles between a plurality of areas on the adaptor frame AF combined with the dampers DA1 to DA4 and the body of the drone BD may be different from each other. In other words, if it is assumed that the adaptor frame AF is combined with the dampers DA1 to DA4, for example, in the first to fourth areas, at least two of the corresponding first to fourth areas may have different angles formed with the body of the drone BD. Referring to FIG. 5B, for example, it is illustrated that the angle between the area combined with the damper DA1 in the adaptor frame AF and the body of the drone BD (angle between D1 and BD) is smaller than the angle between the area combined with the damper DA2 in the adaptor frame AF and the body of the drone BD (angle between D2 and BD). However, the embodiment of the present disclosure is not limited thereto.

The bridge frame BF may be connected to the adaptor frame AF and the second damping part DP2. In other words, some areas of the bridge frame BF may be connected to the adaptor frame AF, and some other areas of the bridge frame BF may be connected to the second damping part DP2. In this case, the bridge frame BF may be connected to the adaptor frame AF through the dampers DA1 to DA4, and may be attached to the second damping part DP2 through structures such as bolts, nuts, and washers.

For some examples, the bridge frame BF may include a plurality of areas that may be combined with dampers DA1 to DA4. The bridge frame BF may include through-holes through which bolts for fixing the bridge frame BF to the dampers DA1 to DA4 can pass.

Meanwhile, the bridge frame BF may include at least one inflection point (hereinafter, referred to as "IP"). In this case, the inflection point IP is a point where the angle of the bridge frame BF is changed, and may also be called a hinge or a joint. Referring to FIG. 5B, for example, the bridge frame BF may include two inflection points IP1 and IP2. However, the embodiment of the present disclosure is not limited thereto, and the number of inflection points IP can be freely modified.

As described above, the mission equipment mount apparatus of the present disclosure may facilitate the replacement process of the damping frame through modularization of the damping frame (adaptor frame AF and bridge frame BF).

That is, the mission equipment mount apparatus of the present disclosure may encompass damping frames of various shapes and forms (e.g., damper angles of the adaptor frame), and through such modularization of the damping frame, may select an appropriate damping frame depending on the characteristics, purpose, and load structure of the mission equipment so as to be easily combined with the body of the drone BD. Accordingly, it may be easy to mount or detach the mission equipment mount apparatus on or from the body of the drone BD.

The dampers DA1 to DA4 may be disposed between the adaptor frame AF and the bridge frame BF. FIG. 5A shows that the dampers DA1 to DA4 are disposed in a total of four areas, but the embodiment of the present disclosure is not limited thereto, and the number of areas where the dampers DA1 to DA4 are disposed can be freely modified. Of course, the first damping part DP1 may include structures, such as bolts, nuts, and washers, to fix the dampers DA1 to DA4, the adaptor frame AF, and the bridge frame BF.

The dampers DA1 to DA4 may include complex dampers DA1 and DA3 and single dampers DA2 and DA4.

The single damper DA2 or DA4 may include a wire damper (hereinafter, referred to as "WD"). The wire damper WD plays the role of attenuating vibrations by using a wire or spring. However, the embodiment of the present disclosure is not limited thereto, and the single damper DA2 or DA4 may include various types of dampers, such as a sponge damper (hereinafter, referred to as "SD"), urethane damper, rubber damper, liquid damper, air damper, and viscoelastic damper.

The complex damper DA1 or DA3 may mean a damper in the form in which different dampers which use different types of damping mechanisms are combined. For example, the complex damper DA1 or DA3 may include a damper in the form in which a wire damper WD and a sponge damper SD are combined, but the embodiment of the present disclosure is not limited thereto.

In this case, as illustrated in FIG. 5C, the complex damper DA1 may be in the form in which a sponge damper SD is seated inside a wire damper WD, but the embodiment of the present disclosure is not limited thereto.

In FIGS. 5A to 5C, for visual distinction of the complex dampers DA1 and DA3 and the single dampers DA2 and DA4, the complex damper DA1 or DA3 is illustrated in the form in which a wire damper WD shown in white and a sponge damper SD shown in black are combined with each other, and the single damper DA2 or DA4 is illustrated in the form of a wire damper WD shown in white.

For some examples, at least two of the plurality of dampers DA1 to DA4 may have different damping parameters.

For example, some of the plurality of dampers DA1 to DA4 may be the complex dampers DA1 and DA3, and some other dampers may be the single dampers DA2 and DA4.

For another example, at least two of the plurality of dampers DA1 to DA4 may have different angles connecting the adaptor frame AF and the bridge frame BF to each other. In other words, the angle at which any one of the plurality of dampers DA1 to DA4 connects the adaptor frame AF and the bridge frame BF to each other may be different from the angle at which another of the plurality of dampers DA1 to DA4 connects the adaptor frame AF and the bridge frame BF to each other.

That is, as described above, the angles between the plurality of areas on the adaptor frame AF combined with the dampers DA1 to DA4 and the body of the drone BD may be different from each other, and the bridge frame BF may include at least one inflection point IP1 and IP2. Accordingly, the angles at which the dampers DA1 to DA4 connect the adaptor frame AF and the bridge frame BF to each other may be different from each other.

For example, the complex dampers DA1 and DA3 and the single dampers DA2 and DA4 may have different angles connecting the adaptor frame AF and the bridge frame BF to each other.

Referring to FIG. 5B, for example, it is illustrated that in case of the complex damper DA1, the angle connecting the adaptor frame AF and the bridge frame BF to each other is shown as D1, and in case of the single damper DA2, the angle connecting the adaptor frame AF and the bridge frame BF to each other is shown as D2.

However, the embodiment of the present disclosure is not limited thereto, and even between the complex dampers DA1 and DA3, the angles connecting the adaptor frame AF and the bridge frame BF to each other may be different from each other. That is, the angle at which the complex damper DA1 connects the adaptor frame AF and the bridge frame BF to each other may be different from the angle at which the complex damper DA3 connects the adaptor frame AF and the bridge frame BF to each other.

Meanwhile, the complex dampers DA1 and DA3 may be disposed closer to the body of the drone BD compared to the single dampers DA2 and DA4. In other words, the complex dampers DA1 and DA3 may be disposed at a location that is further spaced apart from the mount part MP compared to the single dampers DA2 and DA4.

In general, in case that the mission equipment is disposed at the location that is further spaced apart from the mount part MP on which the mission equipment is seated, a greater load is applied thereto, and thus the damping force may decrease as the usage thereof increases. That is, as the more load is applied, the damper may be deformed in an unintended direction, and thus the damping force may decrease.

Accordingly, by disposing the complex dampers DA1 and DA3 at the location which is relatively far apart from the mount part MP and thus receives a strong load, the phase change of the dampers can be prevented.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

The invention claimed is:

1. A mission equipment mount apparatus comprising:
a damping part including a first damping part connected to a first side of a body of a drone, a second damping part connected to a second side that is connected to the first side of the body of the drone, and a third damping part connected to a third side that is connected to the second side of the body of the drone;
a mount part which is connected to the second damping part and on which a mission equipment is seated; and
a connecting part configured to connect the second damping part and the mount part to each other,
wherein the damping part has a shape of a ⊏-shaped frame through disposition of the first damping part, the second damping part, and the third damping part.

2. The mission equipment mount apparatus of claim 1, wherein the first side is an upper side of the drone, the second side is a front side of the drone that is a nearest side to the mount part among a plurality of sides of the drone, and the third side is a bottom side of the drone.

3. The mission equipment mount apparatus of claim 1, wherein the connecting part is connected between one side of the mount part and the second damping part.

4. The mission equipment mount apparatus of claim 3, wherein the connecting part is a single arm type frame that is formed between a connecting frame included in the mount part and the second damping part.

5. The mission equipment mount apparatus of claim 1, wherein the mission equipment comprises at least one of an imaging module and a sensing system,
wherein the mount part includes a mount frame on which the imaging module and the sensing system are seated, and
wherein the imaging module is seated inside the mount frame, and the sensing system is seated on an upper side of the mount frame.

6. The mission equipment mount apparatus of claim 1, wherein the first damping part comprises:
an adaptor frame attached to the first side; and
a bridge frame connected to the adaptor frame and the second damping part.

7. The mission equipment mount apparatus of claim 6, wherein the first damping part comprises at least one damper disposed between the adaptor frame and the bridge frame.

8. The mission equipment mount apparatus of claim 7, wherein the damper comprises a single damper composed of a wire damper and a complex damper where a sponge damper is seated on an inside of a wire damper.

9. The mission equipment mount apparatus of claim 8, wherein the single damper and the complex damper have different angles connecting the adaptor frame and the bridge frame to each other.

10. The mission equipment mount apparatus of claim 8, wherein the complex damper is disposed at a location that is further spaced apart from the mount part compared to the single damper.

* * * * *